(12) United States Patent
Okamoto

(10) Patent No.: US 9,692,910 B1
(45) Date of Patent: Jun. 27, 2017

(54) TELEPHONE SWITCHING SYSTEM, TELEPHONE SWITCHING METHOD, TELEPHONE SWITCHING PROGRAM, TELEPHONE SWITCHBOARD, AND MANAGEMENT TERMINAL

(71) Applicant: NEC Platforms, Ltd., Kawasaki-shi, Kanagawa (JP)

(72) Inventor: Kentaroh Okamoto, Kawasaki (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 0 days.

(21) Appl. No.: 15/375,728

(22) Filed: Dec. 12, 2016

(30) Foreign Application Priority Data

Dec. 21, 2015 (JP) .................................. 2015-248403

(51) Int. Cl.
*H04M 15/00* (2006.01)
*H04M 17/00* (2006.01)
(Continued)

(52) U.S. Cl.
CPC ......... *H04M 15/47* (2013.01); *H04M 3/2281* (2013.01); *H04M 15/84* (2013.01);
(Continued)

(58) Field of Classification Search
CPC ........ H04M 3/2281; H04M 3/36; H04M 3/38; H04M 1/677; H04M 9/005; H04M 9/002;
(Continued)

(56) References Cited

U.S. PATENT DOCUMENTS 4,095,056 A * 6/1978 Ewen .................... H04M 1/677
379/189
5,694,461 A * 12/1997 Lee ....................... H04M 1/677
379/156
(Continued)

FOREIGN PATENT DOCUMENTS

CA 2846718 A1 9/2014
JP 6-350698 A 12/1994
(Continued)

OTHER PUBLICATIONS

Japanese Office Action for Patent Application No. 2015-248403 dated May 17, 2016.
(Continued)

*Primary Examiner* — Binh Tieu
(74) *Attorney, Agent, or Firm* — Sughrue Mion, PLLC

(57) ABSTRACT

A telephone switching system capable of enabling an administrator to easily change the setting when an illegal outgoing call is detected and the illegal outgoing call is regulated is provided. A telephone switchboard includes a detection section for detecting an occurrence of a predetermined event, an e-mail creation section for creating a notification mail in which a content of the detected event is described, and a transmitting section for transmitting the notification mail, and the management terminal includes a receiving section for receiving the notification mail, an e-mail creation section for creating a reply mail corresponding to the notification mail, and a transmitting section for transmitting the reply mail. Further, the telephone switchboard further includes a receiving section for receiving the reply mail, and a setting section for setting an operation condition for a predetermined operation performed by the telephone switchboard based on the reply mail received.

9 Claims, 11 Drawing Sheets

(51) Int. Cl.
*H04M 3/00* (2006.01)
*H04M 3/22* (2006.01)

(52) U.S. Cl.
CPC ............... *H04M 2203/6027* (2013.01); *H04Q 2213/13139* (2013.01)

(58) Field of Classification Search
CPC .. H04M 15/47; H04M 19/02; H04M 2201/40; H04M 2201/41; H04M 2203/2066; H04L 12/28; H04L 63/083; H04L 63/0218; H04L 63/0263; H04L 63/1408; H04L 63/20; H04W 36/0005; H04W 36/0061; G10L 15/08; G10L 15/083; G10L 2015/088
USPC ...... 379/114.14, 133, 134, 144.03, 188, 196, 379/198, 145
See application file for complete search history.

(56) References Cited

U.S. PATENT DOCUMENTS

| | | | |
|---|---|---|---|
| 5,706,338 A | | 1/1998 | Relyea et al. |
| 5,995,604 A | * | 11/1999 | Chan ..................... H04M 9/002 379/145 |
| 6,320,948 B1 | * | 11/2001 | Heilmann ........... H04L 63/0218 379/114.14 |
| 7,009,510 B1 | | 3/2006 | Douglass et al. |
| 7,860,222 B1 | * | 12/2010 | Sidler ................... H04L 63/302 379/266.1 |
| 8,560,557 B1 | * | 10/2013 | Poe ........................ G06Q 10/06 707/754 |
| 9,560,194 B2 | * | 1/2017 | Hodge .................... H04M 1/67 |
| 2003/0129973 A1 | * | 7/2003 | Oishi ..................... H04M 3/54 455/414.1 |
| 2004/0029564 A1 | | 2/2004 | Hodge |
| 2006/0010206 A1 | * | 1/2006 | Apacible ............... H04M 3/436 709/205 |
| 2007/0036314 A1 | | 2/2007 | Kloberdans et al. |
| 2007/0041545 A1 | * | 2/2007 | Gainsboro .......... H04M 3/2281 379/188 |
| 2012/0246248 A1 | | 9/2012 | Arita |
| 2015/0061858 A1 | | 3/2015 | Malnati |

FOREIGN PATENT DOCUMENTS

| | | |
|---|---|---|
| JP | 7-23460 A | 1/1995 |
| JP | 2003-44416 A | 2/2003 |
| JP | 2006-229835 A | 8/2006 |
| JP | 2007-28643 A | 2/2007 |
| JP | 2007-267099 A | 10/2007 |
| JP | 2008-219385 A | 9/2008 |
| JP | 2012-203588 A | 10/2012 |

OTHER PUBLICATIONS

Japanese Office Action for Patent Application No. 2015-248403 dated Jan. 19, 2016.
Japanese Decision Grant for Patent Application No. 2015-248403 dated Sep. 27, 2016.
Communication dated Jan. 20, 2017, issued by the Canadian Intellectual Property Office in corresponding Canada Application No. 2,952,210.
EP Search Report issued May 4, 2017 in EP Application No. 16201141.5.

* cited by examiner

| TIME OF OUTGOING CALL | CALLING SOURCE | CALLING DESTINATION | CALLING SOURCE REGULATION | CALLING DESTINATION REGULATION |
|---|---|---|---|---|
| 2015/6/13 8:13 | 090-1342-XXXX | 001-44-386-YYYY | ☑ | ☐ |
| 2015/6/13 10:37 | 090-1342-XXXX | 001-39-735-YYYY | ☑ | ☑ |
| 2015/6/13 19:26 | 090-6891-XXXX | 001-31-635-YYYY | ☐ | ☑ |
| 2015/6/13 23:21 | 070-3461-XXXX | 001-44-153-YYYY | ☑ | ☑ |
| 2015/6/14 5:11 | 070-7612-XXXX | 001-84-531-YYYY | ☑ | ☐ |
| 2015/6/14 9:19 | 070-7612-XXXX | 001-84-531-YYYY | ☑ | ☐ |
| 2015/6/14 13:45 | 090-4298-XXXX | 81-3-5431-YYYY | ☑ | ☑ |
| 2015/6/14 22:41 | 090-1342-XXXX | 001-1-7854-YYYY | ☑ | ☐ |
| 2015/6/15 1:39 | 090-4298-XXXX | 81-3-5431-YYYY | ☑ | ☑ |
| 2015/6/15 4:58 | 070-5849-XXXX | 001-55-512-YYYY | ☐ | ☑ |

TRANSMISSION OF COMMAND

Fig. 10

TELEPHONE SWITCHING SYSTEM, TELEPHONE SWITCHING METHOD, TELEPHONE SWITCHING PROGRAM, TELEPHONE SWITCHBOARD, AND MANAGEMENT TERMINAL

INCORPORATION BY REFERENCE

This application is based upon and claims the benefit of priority from Japanese patent application No. 2015-248403, filed on Dec. 21, 2015, the disclosure of which is incorporated herein in its entirety by reference.

BACKGROUND OF THE INVENTION

1. Technical Field

The present invention relates to a telephone switching system, a telephone switching method, a telephone switching program, a telephone switchboard, and a management terminal. In particular, the present invention relates to a telephone switching system, a telephone switching method, a telephone switching program, a telephone switchboard, and a management terminal for preventing illegal use (or dishonest use).

2. Background Art

Recently, cases in which a malicious third party illegally accesses a telephone switchboard of a company through the Internet and makes an international telephone call or the like through that telephone switchboard by using means for disguising his/her call as being a call from an extension telephone of the company or means for changing the setting of the telephone switchboard, and then the company is charged a large amount of telephone charges later are occurring one after another. To cope with such a problem, development of techniques related to networks and telephone systems capable of recognizing illegal use have been underway.

For example, Japanese Unexamined Patent Application Publication No. H06-350698 discloses an invention in which at least one attribute of a telephone call in which a network is accessed is monitored in real time and when this attribute indicates abnormal illegal use of the network, a customer of the network is notified of the abnormal illegal use in real time.

Further, Japanese Unexamined Patent Application Publication No. H07-023460 discloses a method for making use of a blacklist in a mobile telephone system. Specifically, Japanese Unexamined Patent Application Publication No. H07-023460 discloses the following invention. Each mobile telephone exchange as well as each base station is equipped with a blacklist for visitor stations. Further, when each mobile telephone exchange receives an outgoing call or a location registration request transmitted from a roaming mobile device through a base station, it searches the blacklist of visitor stations for a device number of that mobile device. Then, when the device number is found in the blacklist, each mobile telephone exchange disconnects its connection. Further, when the device number is not found in the blacklist and the mobile device is determined to be a non-subscriber mobile device, each mobile telephone exchange records the device number in the blacklist of visitor stations.

SUMMARY

However, in Japanese Unexamined Patent Application Publication No. H06-350698, no specific method for reporting illegal use to the customer is clearly described. Further, Japanese Unexamined Patent Application Publication No. H06-350698 discloses no method for blocking (i.e., preventing) illegal use, in particular, no specific example method at all.

Further, the invention disclosed in Japanese Unexamined Patent Application Publication No. H07-023460 is an invention in which a mobile device that is not registered in a subscriber registration list is registered in a blacklist. That is, an administrator is not notified of an occurrence of an illegal outgoing call in the invention disclosed in Japanese Unexamined Patent Application Publication No. H07-023460. Further, in the invention disclosed in Japanese Unexamined Patent Application Publication No. H07-023460, the administrator does not set (or define) a condition for determining illegal access.

Further, when access from the Internet is restricted too strictly in order to prevent any illegal use, the usability for legitimate use is impaired. It is conceivable to strictly regulate outgoing calls from a telephone switchboard. However, this could also restrict necessary outgoing calls. To temporarily cancel the outgoing call restriction, an administrator of the telephone system has to access the telephone switchboard every time a necessary outgoing call is restricted and has to change the setting one by one.

The present invention has been made in view of the above-described problem and an exemplary object thereof is to provide a telephone switching system, a telephone switching method, a telephone switching program, a telephone switchboard, and a management terminal capable of, when a predetermined event such as illegal use is detected and the detected predetermined event is regulated, enabling an administrator to easily change the setting.

In a first exemplary aspect of the invention, a telephone switching system includes a telephone switchboard and a management terminal connected to the telephone switchboard, in which the telephone switchboard includes: detection means for detecting an occurrence of a predetermined event; e-mail creation means for creating a notification mail in which a content of the event detected by the detection means is described; and transmitting means for transmitting the notification mail to the management terminal, the management terminal includes: receiving means for receiving the notification mail; e-mail creation means for creating a reply mail corresponding to the notification mail received by the receiving means; and transmitting means for transmitting the reply mail to the telephone switchboard, and the telephone switchboard further includes: receiving means for receiving the reply mail; and setting means for setting an operation condition for a predetermined operation performed by the telephone switchboard based on the reply mail received by the receiving means, and wherein the reply mail is a blank mail, and wherein the creation and the transmission of the reply mail in the management terminal are automatically carried out based on a preparatory setting without involving an operation by a user.

In a second exemplary aspect of the invention, a telephone switchboard used in a telephone switching system including the telephone switchboard and a management terminal connected to the telephone switchboard, includes detection means for detecting an occurrence of a predetermined event; e-mail creation means for creating a notification mail in which a content of the event detected by the detection means is described; transmitting means for transmitting the notification mail to the management terminal, receiving means for receiving a reply mail corresponding to the notification mail from the management terminal, the management terminal being configured to create the reply mail; and setting means for setting an operation condition for a predetermined operation performed by the telephone switchboard based on the reply mail received by the receiving means, and wherein the reply mail is a blank mail.

In a third exemplary aspect of the invention, a management terminal used in a telephone switching system including a telephone switchboard and the management terminal, includes: receiving means for receiving a notification mail from the telephone switchboard, the telephone switchboard being configured to detect an occurrence of a predetermined event, create the notification mail in which a content of the detected event is described, and transmit the notification mail to the management terminal; creation means for creating a reply mail corresponding to the notification mail received by the receiving means, the reply mail being a mail for setting an operation condition for a predetermined operation performed by the telephone switchboard based on the reply mail; and transmitting means for transmitting the reply mail to the telephone switchboard, and wherein the reply mail is a blank mail, and wherein the creation and the transmission of the reply mail in the management terminal are automatically carried out based on a preparatory setting without involving an operation by a user.

In a fourth exemplary aspect of the invention, a telephone switching method in a telephone switching system including a telephone switchboard and a management terminal connected to the telephone switchboard, includes: detecting, by detection means of the telephone switchboard, an occurrence of a predetermined event; creating, by mail creation means of the telephone switchboard, an e-mail in which a content of the event detected by the detection means is described; transmitting, by transmitting means of the telephone switchboard, the e-mail to the management terminal; receiving, by receiving means of the management terminal, the e-mail; creating, by creation means of the management terminal, a reply mail to the e-mail received by the receiving means; transmitting, by transmitting means of the management terminal, the reply mail to the telephone switchboard; receiving, by receiving means of the telephone switchboard, the reply mail; and setting, by setting means of the telephone switchboard, an operation condition for a predetermined operation performed by the telephone switchboard based on the reply mail received by the receiving means of the telephone switchboard, and wherein the reply mail is a blank mail, and wherein the creation and the transmission of the reply mail in the management terminal are automatically carried out based on a preparatory setting without involving an operation by a user.

In a fifth exemplary aspect of the invention, a telephone switching program for causing a computer to function as a telephone switchboard used in a telephone switching system including the telephone switchboard and a management terminal connected to the telephone switchboard, causes the computer to function as: detection means for detecting an occurrence of a predetermined event; e-mail creation means for creating a notification mail in which a content of the event detected by the detection means is described; transmitting means for transmitting the notification mail to the management terminal, receiving means for receiving a reply mail to the notification mail from the management terminal, the management terminal being configured to create the reply mail; and setting means for setting an operation condition for a predetermined operation performed by the telephone switchboard based on the reply mail received by the receiving means, and wherein the reply mail is a blank mail.

In a sixth exemplary aspect of the invention, a telephone switching program for causing a computer to function as a management terminal used in a telephone switching system including a telephone switchboard and the management terminal, causes the computer to function as: receiving means for receiving an e-mail from the telephone switchboard, the telephone switchboard being configured to detect an occurrence of a predetermined event, create the e-mail in which a content of the detected event is described, and transmit the e-mail to the management terminal; creation means for creating a reply mail to the e-mail received by the receiving means, the reply mail being a mail for setting an operation condition for a predetermined operation performed by the telephone switchboard based on the reply mail; and transmitting means for transmitting the reply mail to the telephone switchboard, and wherein the reply mail is a blank mail, and wherein the creation and the transmission of the reply mail in the management terminal are automatically carried out based on a preparatory setting without involving an operation by a user.

According to the present invention, it is possible, when a predetermined event is detected and the detected predetermined event is regulated, to enable an administrator to easily change the setting of a telephone switchboard.

BRIEF DESCRIPTION OF THE DRAWINGS

The above and other aspects, features, and advantages of the present invention will become more apparent from the following description of certain exemplary embodiments when taken in conjunction with the accompanying drawings, in which:

FIG. 10 is an example of a picture displayed in display means of a management terminal according to an exemplary embodiment of the present invention.

EXEMPLARY EMBODIMENTS

First Exemplary Embodiment

Firstly, a first exemplary embodiment is explained in detail with reference to FIGS. 1 to 5.

Figure 1:
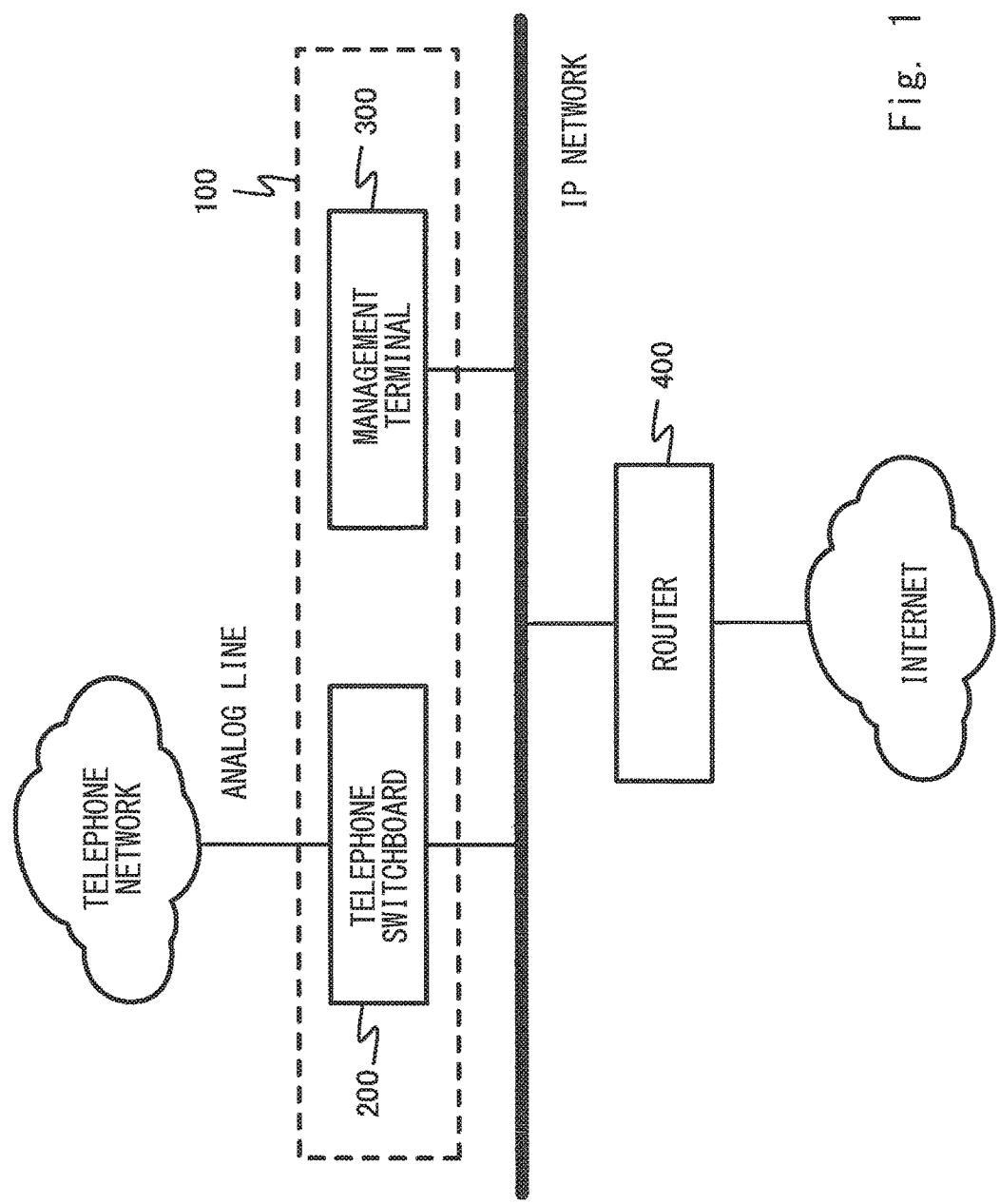
FIG. 1 shows a configuration example of a telephone switching system according to an exemplary embodiment of the present invention.

FIG. 1 shows a configuration example of a telephone switching system 100 according to a first exemplary embodiment.

As shown in FIG. 1, the telephone switching system 100 according to the first exemplary embodiment includes a telephone switchboard 200 and a management terminal 300. Further, the telephone switchboard 200 and the management terminal 300, which form the telephone switching system 100, and a router 400 can communicate with each other through an IP network.

The telephone switchboard 200 includes an analog line connected to a telephone network, and can make an outgoing call to an outside line and receive an incoming call from the outside line. Further, the telephone switchboard 200 can perform IP communication through the router 400 connected to the Internet network.

Figure 2:
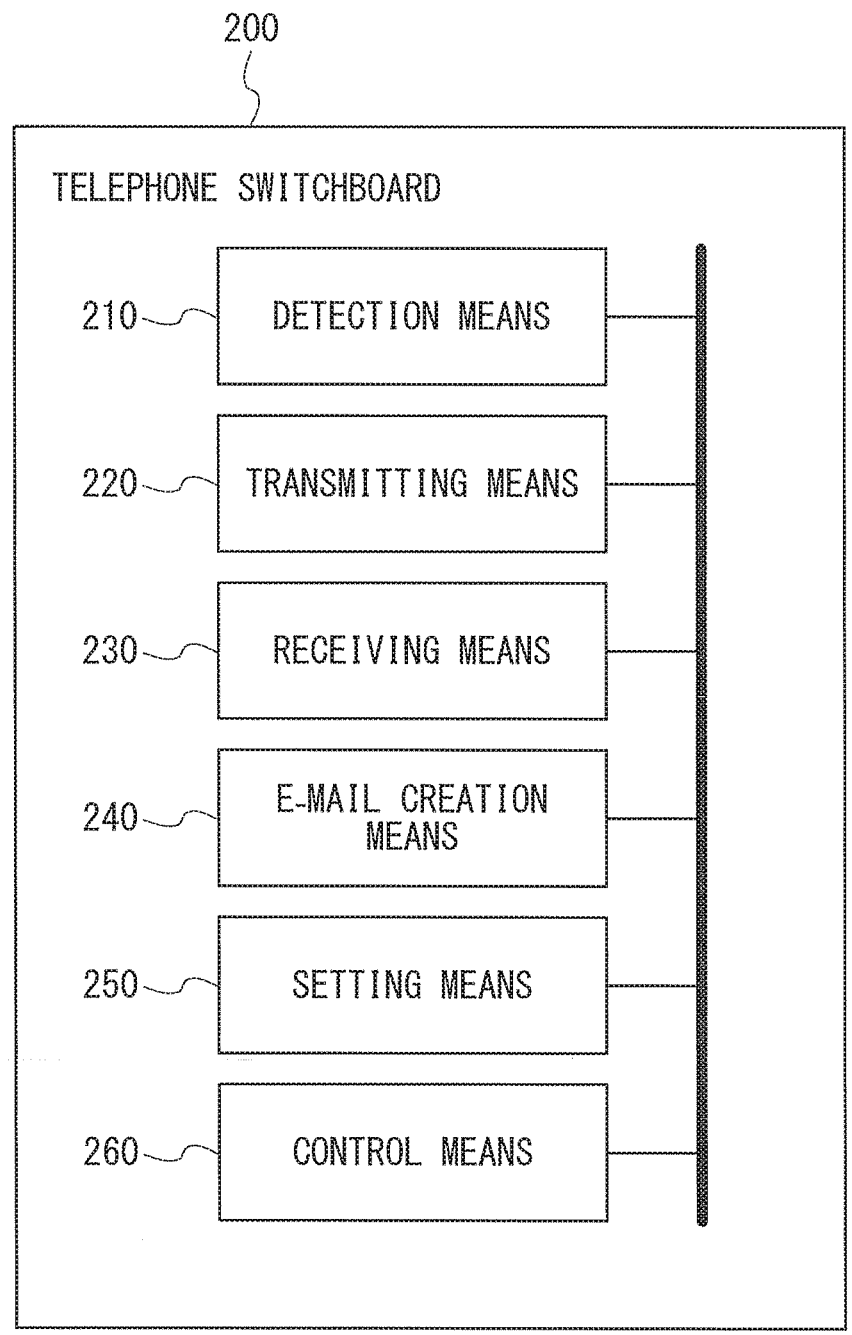
FIG. 2 shows a configuration example of a telephone switchboard according to an exemplary embodiment of the present invention.

FIG. 2 shows a configuration example of the telephone switchboard 200.

The telephone switchboard 200 includes detection means 210, transmitting means 220, receiving means 230, electronic mail (hereinafter referred to as "e-mail") creation means 240, setting means 250, and control means 260. These components included in the telephone switchboard 200 can communicate with each other through a bus.

As described later, the detection means 210 detects an occurrence of a predetermined event, e.g., an occurrence of illegal use such as an illegal outgoing call. The transmitting means 220 transmits a notification mail or the like that is created by the e-mail creation means 240 and indicates an occurrence of a predetermined event, e.g., an occurrence of illegal use such as an illegal outgoing call to the management terminal 300. The receiving means 230 receives a reply mail or the like from the management terminal 300. The e-mail creation means 240 creates the above-described notification mail or the like indicating an occurrence of the predetermined event, e.g., an occurrence of illegal use such as an illegal outgoing call. The setting means 250 sets (or configures) the telephone switchboard 200 based on condition data or an e-mail received from the management terminal 300. For example, the setting means 250 makes a setting for a condition for detecting illegal use such as an illegal outgoing call, a condition for blocking the illegal use, and the like. The control means 260 controls the detection means 210, the transmitting means 220, the receiving means 230, the e-mail creation means 240, and the setting means 250.

Figure 3:
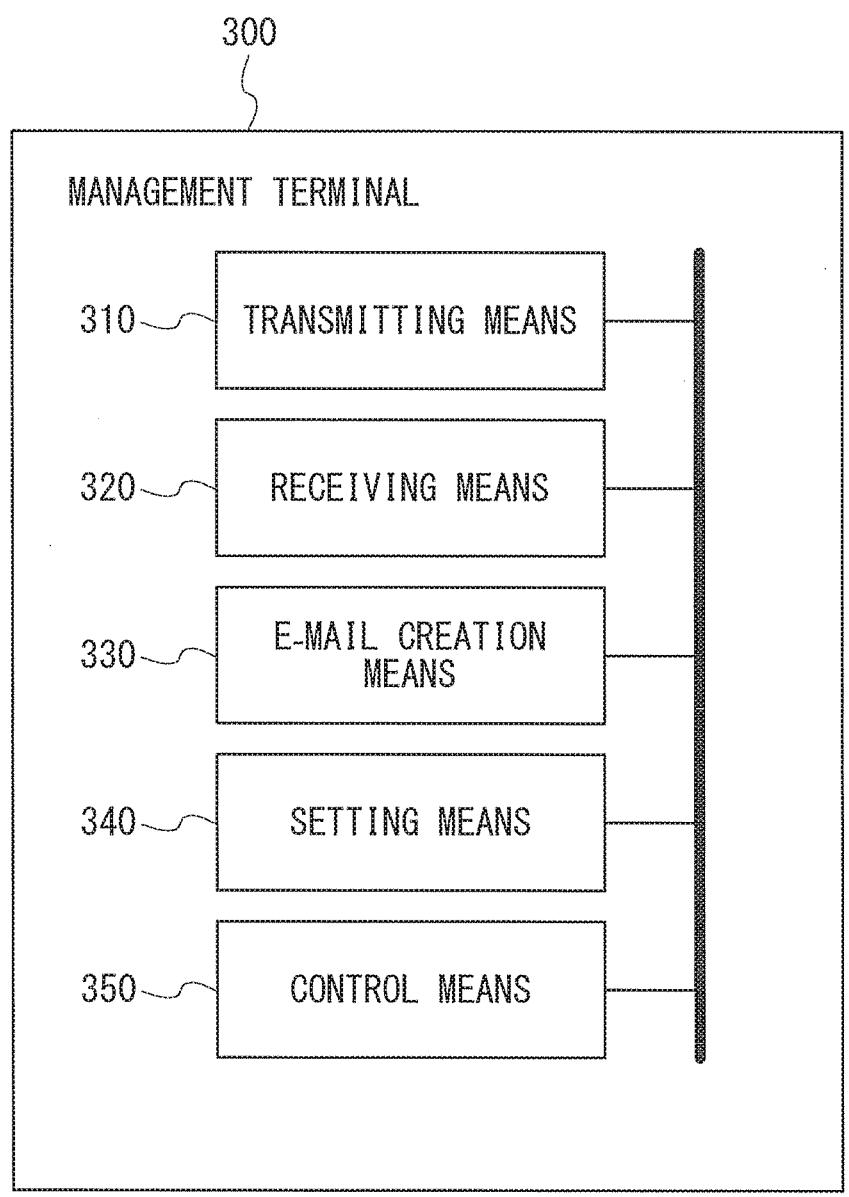
FIG. 3 shows a configuration example of a management terminal according to an exemplary embodiment of the present invention.

FIG. 3 shows a configuration example of the management terminal 300.

The management terminal 300 includes transmitting means 310, receiving means 320, e-mail creation means 330, setting means 340, and control means 350. These components included in the management terminal 300 can communicate with each other through a bus.

As described later, the transmitting means 310 transmits data for a detecting condition for detecting a predetermined event, e.g., illegal use such as an illegal outgoing call set by the setting means 340, a repay mail created by the e-mail creation means 330, and the like to the telephone switchboard 200. The receiving means 320 receives the notification mail or the like indicating an occurrence of the predetermined event, e.g., an occurrence of illegal use such as an illegal outgoing call from the telephone switchboard 200. The e-mail creation means 330 creates a reply mail or the like to the e-mail received from the telephone switchboard 200. The setting means 340 sets telephone switchboard 200. For example, the setting means 340 sets a detecting condition or the like for detecting, for example, a predetermined event, e.g., illegal use such as an illegal outgoing call. The control means 350 controls the transmitting means 310, the receiving means 320, the e-mail creation means 330, and the setting means 340.

Figure 4:
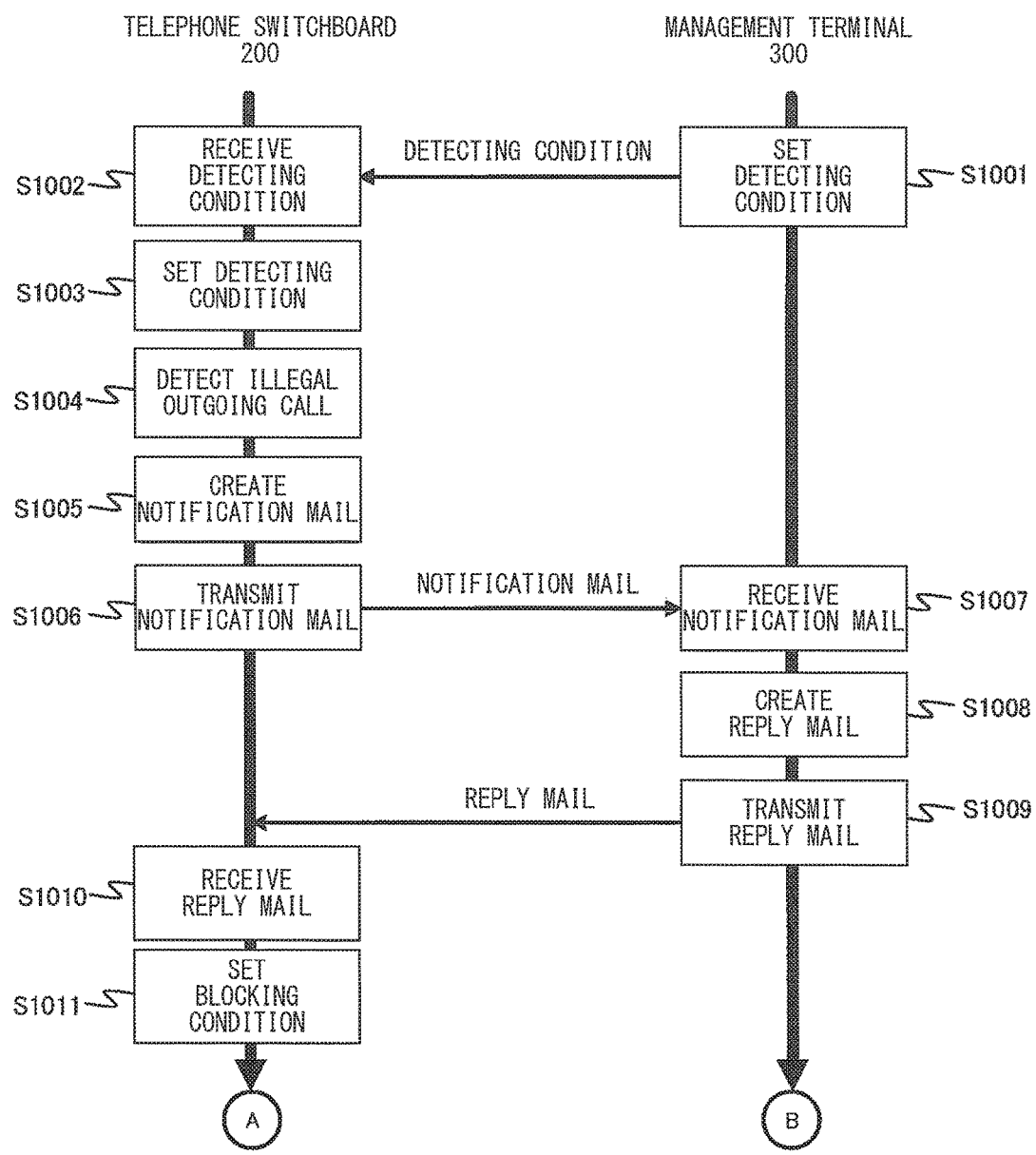
FIG. 4 shows an operation flow of a telephone switching system according to an exemplary embodiment of the present invention.
Figure 5:
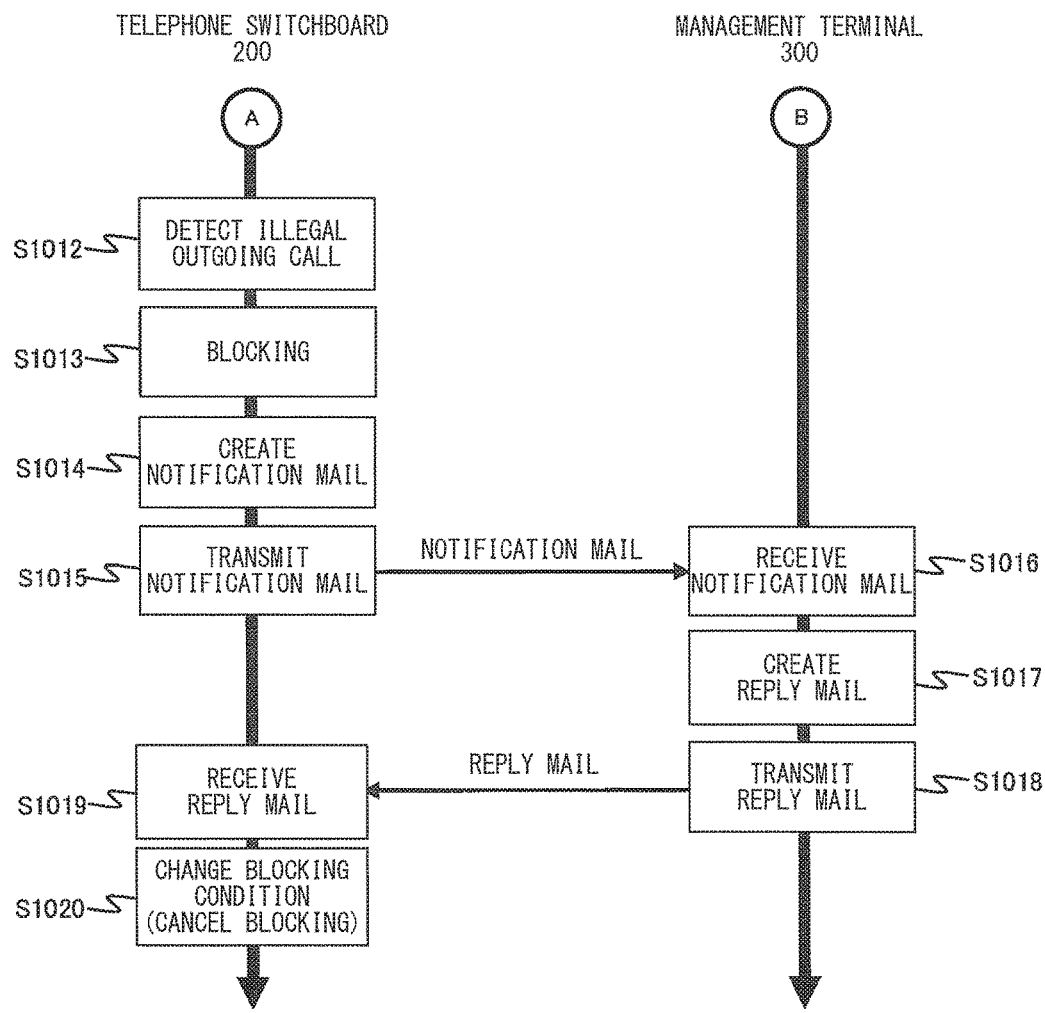
FIG. 5 shows an operation flow of a telephone switching system according to an exemplary embodiment of the present invention.

FIGS. 4 and 5 show an operation flow of the telephone switching system 100 shown in FIG. 1. An example case where an illegal outgoing call occurs as the above-described "predetermined event" in the telephone switchboard 200 is explained hereinafter. However the embodiments according to the present invention are not limited to this example.

Firstly, a user of the telephone switching system 100 sets (or defines) a condition for detecting an event that should be detected in the telephone switchboard 200, i.e., an illegal outgoing call in this example by using the setting means 340 of the management terminal 300. Then, the user transmits data of this detecting condition to the telephone switchboard 200 by using the transmitting means 310 (step S1001). For example, a user sets the following condition in the step S1001.

[Numbers that should be regulated]: numbers that begin with "0011":
[Calling destination line]: analog line; and
[Number of outgoing calls to the number to be regulated before outgoing call is regulated]: one.

Next, the receiving means 230 of the telephone switchboard 200 receives the above-described data of the detecting condition (step S1002).

Next, the setting means 250 of the telephone switchboard 200 sets the condition based on which the detection means 210 detects an illegal outgoing call based on the received data of the detecting condition (step S1003).

Next, the detection means 210 of the telephone switchboard 200 detects (i.e., determines) that an illegal outgoing call has occurred (step S1004). For example, when the above-described condition is set in the above-described step S1001, the detection means 210 determines that an illegal outgoing call has occurred when it detects an outgoing call to "001-1-3567-XXXX" using an analog line.

Next, the e-mail creation means 240 of the telephone switchboard 200 creates a notification mail in which the content (i.e., the details or the like (hereinafter simply referred to as a "content")) of the illegal outgoing call, specifically, the fact that an outgoing call that meets the condition for an illegal outgoing call has occurred is described (step S1005).

Next, the transmitting means 220 of the telephone switchboard 200 transmits the notification mail, in which the content of the illegal outgoing call is described, to the management terminal 300 (step S1006).

Next, the receiving means 320 of the management terminal 300 receives the above-described notification mail (step S1007).

Next, the e-mail creation means 330 of the management terminal 300 creates a reply mail to the above-described notification mail (step S1008). The e-mail creation means 330 may create a setting file in which a setting necessary to regulate illegal outgoing calls is described and attach this setting file to the above-described reply mail. For example, when an outgoing call to "001-1-3567-XXXX" is detected in the above-described step S1004, the e-mail creation means 330 may create a setting file in which it is specified that an outgoing call to "001-1-3567-XXXX" should be blocked after this detection, and attach this setting file to the above-described reply mail in the step S1008. Alternatively, the content (i.e., the details or the like) of a setting necessary to regulate illegal outgoing calls may be written in the above-described reply mail itself. Alternatively, the above-described setting file may not be attached to the above-described reply mail and the above-described reply mail itself may be a blank mail. When the blank mail is transmitted to the telephone switchboard 200 as the reply mail, data for specifying the content of a setting for the blocking condition that is applied when the telephone switchboard 200 receives the blank mail may be transmitted to the telephone switchboard 200 in advance in addition to the data of the detecting condition based on which the telephone switchboard 200 detects an illegal outgoing call in the above-described step S1001, for example, so that the condition for blocking an illegal outgoing call can be set in the below-described step S1011. Further, this reply mail may be manually created by a user of the telephone switching system 100 or may be automatically created by the management terminal 300 based on a preparatory setting or the like.

Next, the transmitting means 310 of the management terminal 300 transmits the above-described reply mail to the telephone switchboard 200 (step S1009).

Next, the receiving means 230 of the telephone switchboard 200 receives the above-described reply mail (step S1010).

Next, the setting means 250 of the telephone switchboard 200 sets (or defines) the condition for blocking the illegal outgoing call (step S1011). For example, when a setting file in which it is specified that an outgoing call to "001-1-3567-XXXX" should be blocked from now on is created in the step S1008, the setting means 250 sets a condition for blocking an illegal outgoing call to "001-1-3567-XXXX" according to the created setting file.

Next, the detection means 210 of the telephone switchboard 200 detects an illegal outgoing call (step S1012). In the case of the above-described example, the detection means 210 detects an outgoing call to "001-1-3567-XXXX" in the step S1012.

Next, the control means 260 of the telephone switchboard 200 blocks the illegal outgoing call detected in the above-described step S1012 (step S1013).

Next, the e-mail creation means 240 of the telephone switchboard 200 creates a notification mail indicating that the illegal outgoing call has been blocked (step S1014).

Next, the transmitting means 220 of the telephone switchboard 200 transmits the above-described notification mail to the management terminal 300 (step S1015).

Next, the receiving means 320 of the management terminal 300 receives the above-described notification mail (step S1016).

Note that when a user of the telephone switching system 100 wants to cancel the above-described blocking, the user creates a reply mail to the notification mail received in the step S1016 by using the e-mail creation means 330 of the management terminal 300 (step S1017). Similarly to the reply mail in the step S1008, this reply mail may be a reply mail to which a setting file in which the content of a setting change is described is attached, a reply mail in which the content of a setting change is described, or a blank mail.

Next, the transmitting means 310 of the management terminal 300 transmits the reply mail created in the step S1017 to the telephone switchboard 200 (step S1018).

Next, the receiving means 230 of the telephone switchboard 200 receives the reply mail transmitted in the above-described step S1018 (step S1019).

Next, upon receiving the above-described reply mail, the setting means 250 of the telephone switchboard 200 changes the blocking condition, which was set in the step S1011, and thereby cancels the blocking (step S1020).

In this way, the user of the telephone switching system 100 can set (or define) an operation condition that is applied when a predetermined event occurs in the telephone switchboard 200, e.g., when an illegal outgoing call occurs in the telephone switchboard 200 just by replying to a mail transmitted from the telephone switchboard 200.

Note that in the above-described example, an outgoing call to a specific calling destination is blocked. However, an outgoing call from a specific source may be blocked in other embodiments.

Further, although an illegal outgoing call is blocked in the above-described example, an illegal incoming call may be blocked in other embodiments. For example, in other embodiments, numbers that begin with "0120" are defined as numbers to be regulated in the above-described step S1001. Then, when it is detected that a call from "0120-345-XXX" is received in the above-described step S1004, a setting is made so that an incoming call from "0120-345-XXX" is blocked after this detection in the above-described step S1008.

Further, in the explanation above, an embodiment in which a notification mail indicating an illegal outgoing call is received only once and a blocking condition is set by replying to this notification mail is described. However, a blocking condition may be set, after receiving the same notification mail indicating an illegal outgoing call a plurality of times, by replying to the last notification mail.

Further, in the explanation above, an embodiment in which blocking is cancelled by replying to a notification mail indicating that an illegal outgoing call has been blocked is described. However, in other embodiments, blocking may not be cancelled by replying to a notification mail indicating that an illegal outgoing call has been blocked, but may be cancelled only when the user replies to a notification mail indicating the illegal outgoing call that occurred prior to the blocking. Alternatively, in other embodiments, blocking may be cancelled by replying to either the notification mail indicating the illegal outgoing call or the notification mail indicating the blocking.

Further, in the explanation above, an embodiment in which a detecting condition for detecting a predetermined event, e.g., an illegal outgoing call is set by the setting means 340 of the management terminal 300 is described. However, a detecting condition based on which the telephone switchboard 200 detects an illegal outgoing call may be set by creating an e-mail containing the detecting condition described therein by using the e-mail creation means 330 and transmitting this e-mail to the telephone switchboard 200 by using the transmitting means 310. Alternatively, in other embodiments, the detecting condition may be set from the telephone switchboard 200 side by using the setting means 250, instead of it being set from the management terminal 300 side by using the setting means 340.

Further, some or all of the transmitting means 310, the receiving means 320, the e-mail creation means 330, the setting means 340, and the control means 350 of the management terminal 300 may be integrally constructed as an "illegal outgoing call control application".

Further, in the explanation above, the telephone switching system 100 according to the present invention includes the telephone switchboard 200 and the management terminal 300. However, the telephone switching system 100 may also include the above-described router 400. In such a case, the telephone switchboard 200 and the router 400 may be integrally constructed.

Further, the above-described detection means 210 of the telephone switchboard 200 may detect illegal access to the telephone switchboard 200 or/and identity fraud. Alternatively, the above-described telephone switching system 100 may be combined with another means for detecting illegal access to the telephone switchboard 200 or/and identity fraud. In such cases, the above-described "predetermined event" may be the illegal access or/and identity fraud themselves, or may be an outgoing call to an illegal calling destination that is carried out after illegal access or/and identity fraud is carried out.

Further, although an e-mail is used as communication means between the telephone switchboard 200 and the management terminal 300 in the above explanation, the communication means is not limited to any particular means. Further, communication according to a uniquely-defined (or proprietary) protocol may be carried out between the telephone switchboard 200 and the management terminal 300. Further, for example, HTTP, FTP, Telnet, TCP, UDP, or the like may be used as the protocol.

According to the above-described first exemplary embodiment, a user can set (or define) and change an operation condition for the telephone switchboard that is applied when a predetermined event occurs, e.g., a blocking condition that is applied when an illegal outgoing call occurs in the above-described example, by receiving and transmitting an e-mail(s). In particular, when the telephone switchboard checks whether or not an e-mail that is received by the telephone switchboard itself and is used to set (or configure) the telephone switchboard itself is legitimate, all that the telephone switchboard has to do is to check whether or not the e-mail is a reply mail to a notification mail that the telephone switchboard itself has transmitted, instead of checking the calling source address of the e-mail. Therefore, a user does not need to register the mail address of the management terminal 300 or the like in the telephone switchboard in advance. Further, a user can select whether outgoing calls are automatically regulated or manually regulated according to the situation such as whether the mail is viewable (i.e., readable) or not. Further, even when outgoing calls are manually regulated, the user can regulate outgoing calls and cancel the regulation just by one action, i.e., just by replying to the received mail. Therefore, compared to the related art, the user can be saved from troublesome tasks.

Second Exemplary Embodiment

Next, a second exemplary embodiment is explained in detail with reference to FIGS. 6 to 11.

An outline of an example of an overall configuration of a telephone switching system 150 according to a second exemplary embodiment is similar to that shown in FIG. 1, and therefore its illustration in the drawing is omitted.

The telephone switching system 150 according to the second exemplary embodiment includes a telephone switchboard 270 and a management terminal 360. Further, the telephone switchboard 270 and the management terminal 360, which form the telephone switching system 150, and a router 400 can communicate with each other through an IP network.

The telephone switchboard 270 includes an analog line connected to a telephone network, and can make an outgoing call to an outside line and receive an incoming call from the outside line. Further, the telephone switchboard 270 can perform IP communication through the router 400 connected to the Internet network.

Figure 6:
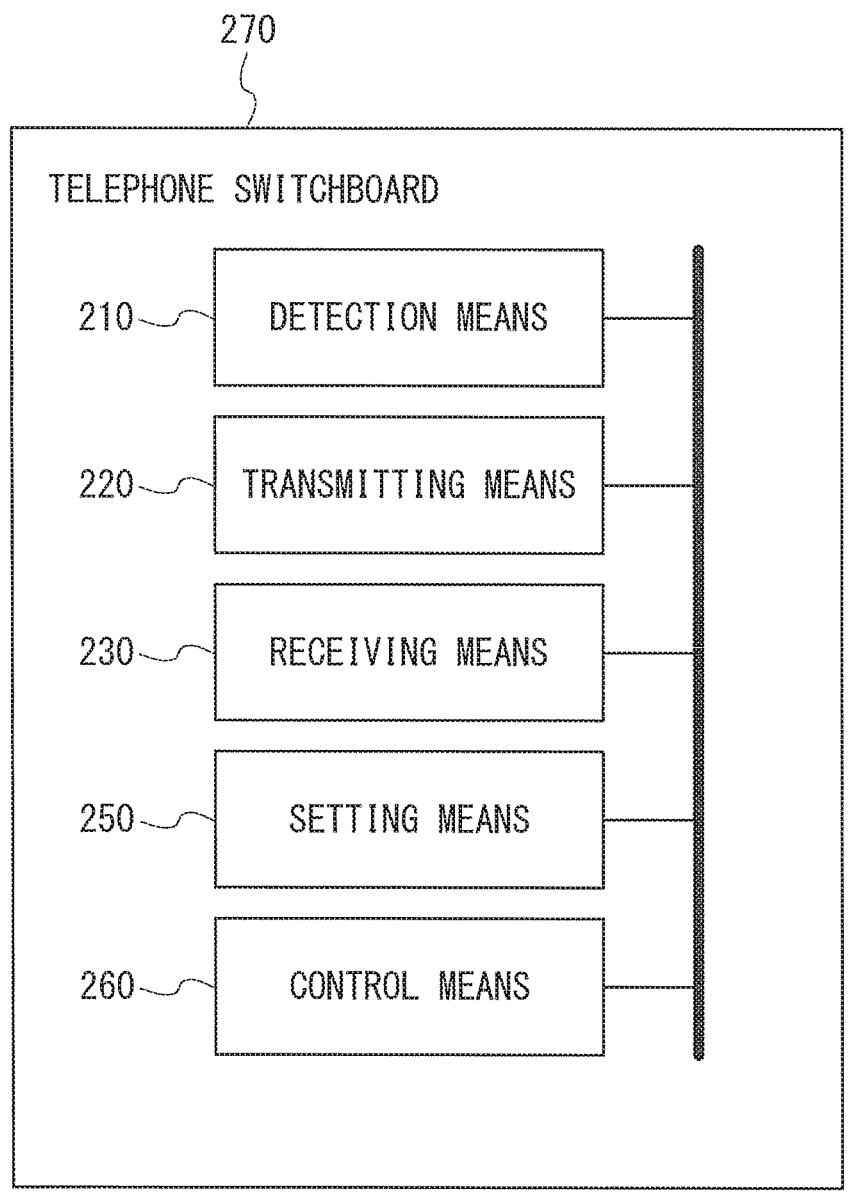
FIG. 6 shows a configuration example of a telephone switchboard according to an exemplary embodiment of the present invention.

FIG. 6 shows a configuration example of the telephone switchboard 270 according to the second exemplary embodiment. The same symbols as those of the telephone switchboard 200 according to the first exemplary embodiment are assigned to the same components as those of the telephone switchboard 200, and their detailed explanations are omitted.

In contrast to the telephone switchboard 200 according to the first exemplary embodiment, the telephone switchboard 270 according to the second exemplary embodiment does not necessarily include the e-mail creation means 240.

Figure 7:
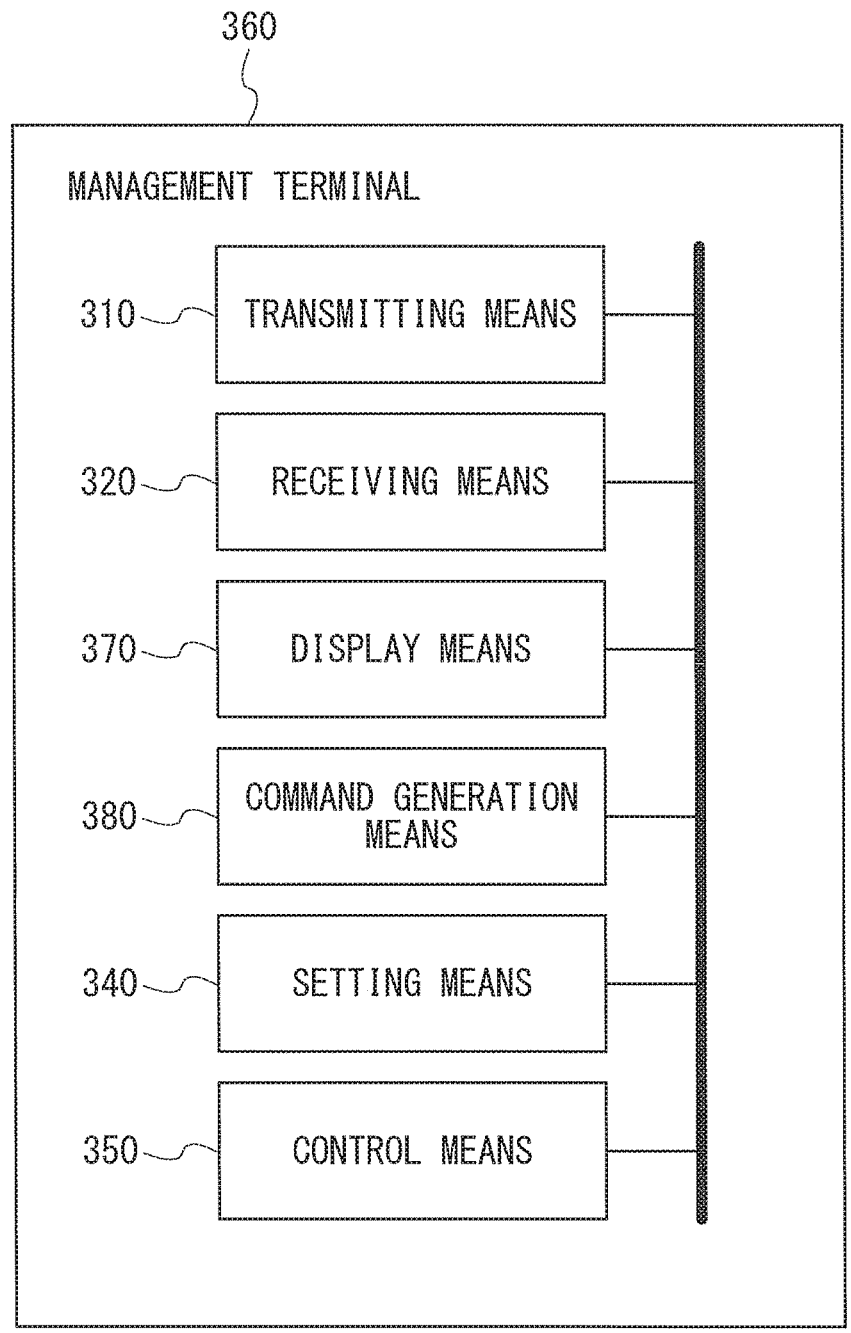
FIG. 7 shows a configuration example of a management terminal according to an exemplary embodiment of the present invention.

FIG. 7 shows a configuration example of the management terminal 360 according to the second exemplary embodiment. The same symbols as those of the management terminal 300 according to the first exemplary embodiment are assigned to the same components as those of the management terminal 300, and their detailed explanations are omitted.

In contrast to the management terminal 300 according to the first exemplary embodiment, the management terminal 360 according to the second exemplary embodiment does not necessarily include the e-mail creation means 330. However, the management terminal 360 includes display means 370 and command generation means 380.

The display means 370 is means for displaying a notification that is transmitted from the telephone switchboard 270 and indicates an occurrence of a predetermined event, e.g., an occurrence of illegal use such as an illegal outgoing call.

The command generation means 380 is means for generating a command corresponding to the above-described notification.

Figure 8:
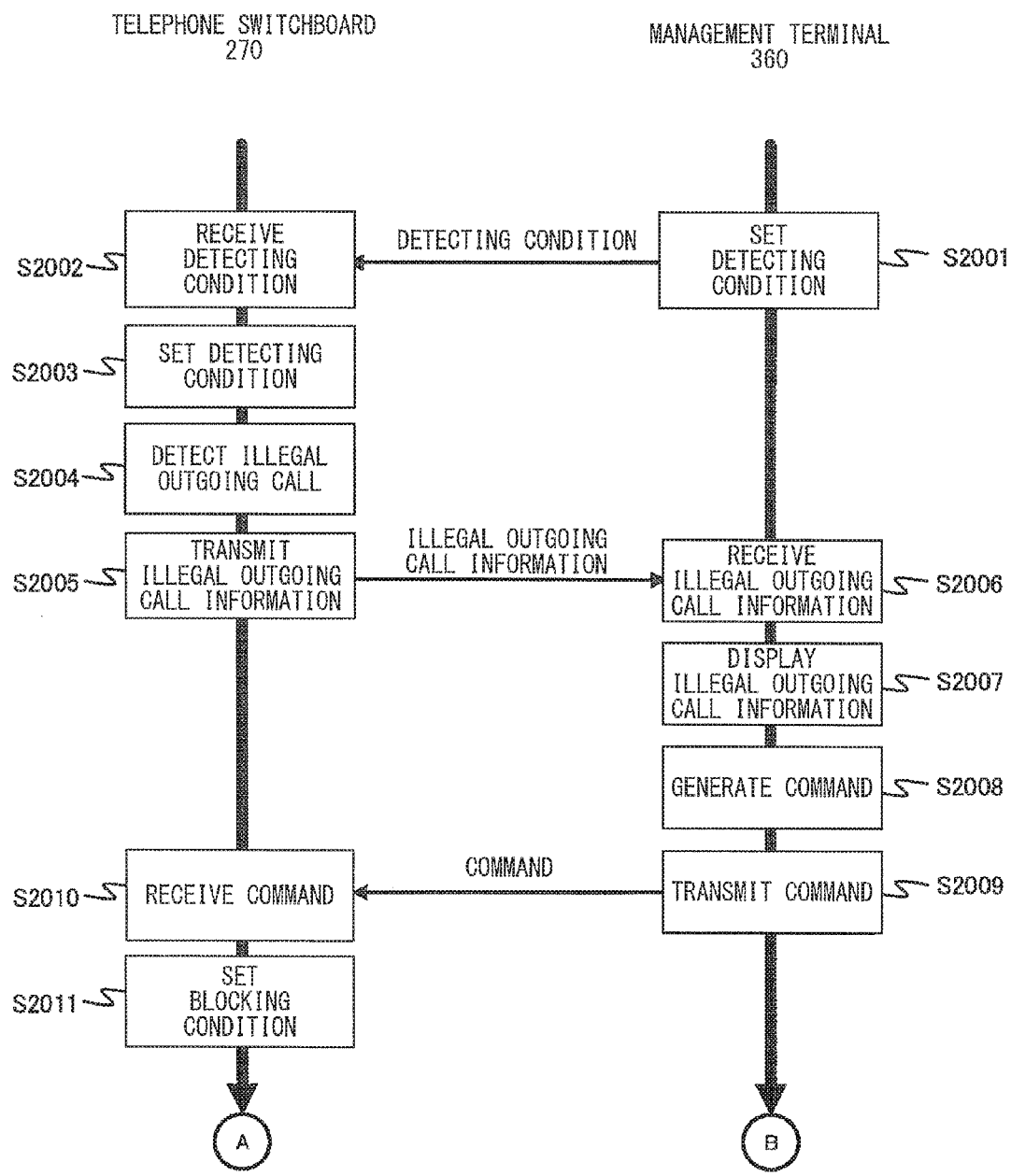
FIG. 8 shows an operation flow of a telephone switching system according to an exemplary embodiment of the present invention.
Figure 9:
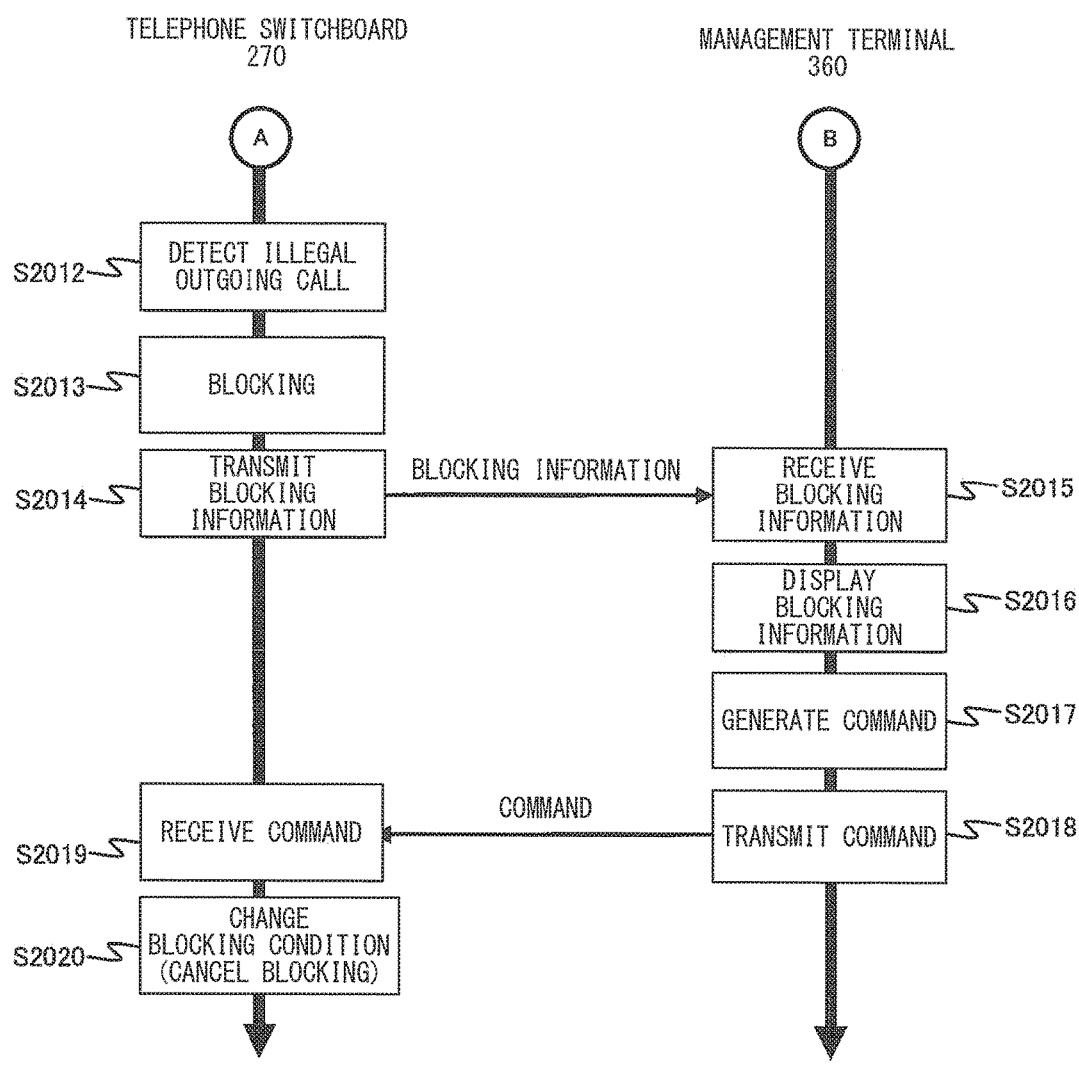
FIG. 9 shows an operation flow of a telephone switching system according to an exemplary embodiment of the present invention.

FIGS. 8 and 9 show an operation flow of the telephone switching system 150 according to the second exemplary embodiment. An example case where an illegal outgoing call occurs as the above-described "predetermined event" in the telephone switchboard 270 is explained hereinafter. However the embodiments according to the present invention are not limited to this example.

Firstly, a user of the telephone switching system 150 sets (or defines) a condition for detecting an event that should be detected in the telephone switchboard 270, i.e., an illegal outgoing call in this example by using the setting means 340 of the management terminal 360. Then, the user transmits data of this detecting condition to the telephone switchboard 270 by using the transmitting means 310 (step S2001).

Next, the receiving means 230 of the telephone switchboard 270 receives the above-described data of the detecting condition (step S2002).

Next, the setting means 250 of the telephone switchboard 270 sets the condition based on which the detection means 210 detects an illegal outgoing call based on the received data of the detecting condition (step S2003).

Next, the detection means 210 of the telephone switchboard 270 detects (i.e., determines) that an illegal outgoing call has occurred (step S2004).

Next, the transmitting means 220 of the telephone switchboard 270 transmits information containing the content of the illegal outgoing call described therein to the management terminal 360 (step S2005).

Next, the receiving means 320 of the management terminal 360 receives the above-described illegal outgoing call information (step S2006).

Next, the display means 370 of the management terminal 360 displays the above-described illegal outgoing call information (step S2007). FIG. 10 shows a specific example of the display.

As shown in FIG. 10, data that meets the condition for detecting an illegal outgoing call set in the above-described step S2003 are displayed in the form of a table in the display means 370. Specifically, from the leftmost column, times of illegal outgoing calls, calling sources, calling destinations, checkboxes for call-source regulation, and checkboxes for call-destination regulation are displayed in this order.

For example, when a user wants to block illegal outgoing calls called from "090-1342-XXXX" listed on the first row from now on, the user ticks the checkbox for the "call-source regulation" on that row. As a result, checkboxes for the "call-source regulation" of data indicating illegal outgoing calls called from "090-1342-XXXX" listed on other rows are also automatically ticked.

Further, for example, when a user wants to block illegal outgoing calls called to "81-3-5431-YYYY" listed on the seventh row from now on, the user ticks the checkbox for the "call-source regulation" on that row. As a result, checkboxes for the "call-destination regulation" of data indicating illegal outgoing calls called to "81-3-5431-YYYY" listed on other rows are also automatically ticked.

After the user ticks the checkboxes for all of the "call-source regulations" and/or "call-destination regulations" that the user wants to impose, the user clicks the button for "command transmission". In response to this, the command generation means 380 of the management terminal 360 generates a command based on the user's input (step S2008). Note that this command generation may be manually carried out by the user of the telephone switching system 150 as described above, or may be automatically carried out by the management terminal 360 based on a preparatory setting or the like.

Next, the transmitting means 310 of the management terminal 360 transmits the command created in the step S2008 to the telephone switchboard 270 (step S2009).

Next, the receiving means 230 of the telephone switchboard 270 receives the above-described command (step S2010).

Next, the setting means 250 of the telephone switchboard 270 sets the condition for blocking the illegal outgoing call (step S2011). For example, when a checkbox for the "call-source regulation" of illegal outgoing call data whose calling source is "090-1342-XXXX" is ticked in the above-described step S2008, the setting means 250 sets a condition for blocking outgoing calls called from "090-1342-XXXX" according to the ticking.

Next, the detection means 210 of the telephone switchboard 270 detects an illegal outgoing call (step S2012). In the case of the above-described example, an outgoing call from "090-1342-XXXX" is detected.

Next, the control means 260 of the telephone switchboard 270 blocks the illegal outgoing call detected in the above-described step S2012 (step S2013).

Next, the transmitting means 220 of the telephone switchboard 270 transmits blocking information indicating that the illegal outgoing call has been blocked to the management terminal 360 (step S2014).

Next, the receiving means 320 of the management terminal 360 receives the above-described blocking information (step S2015).

Figure 11:
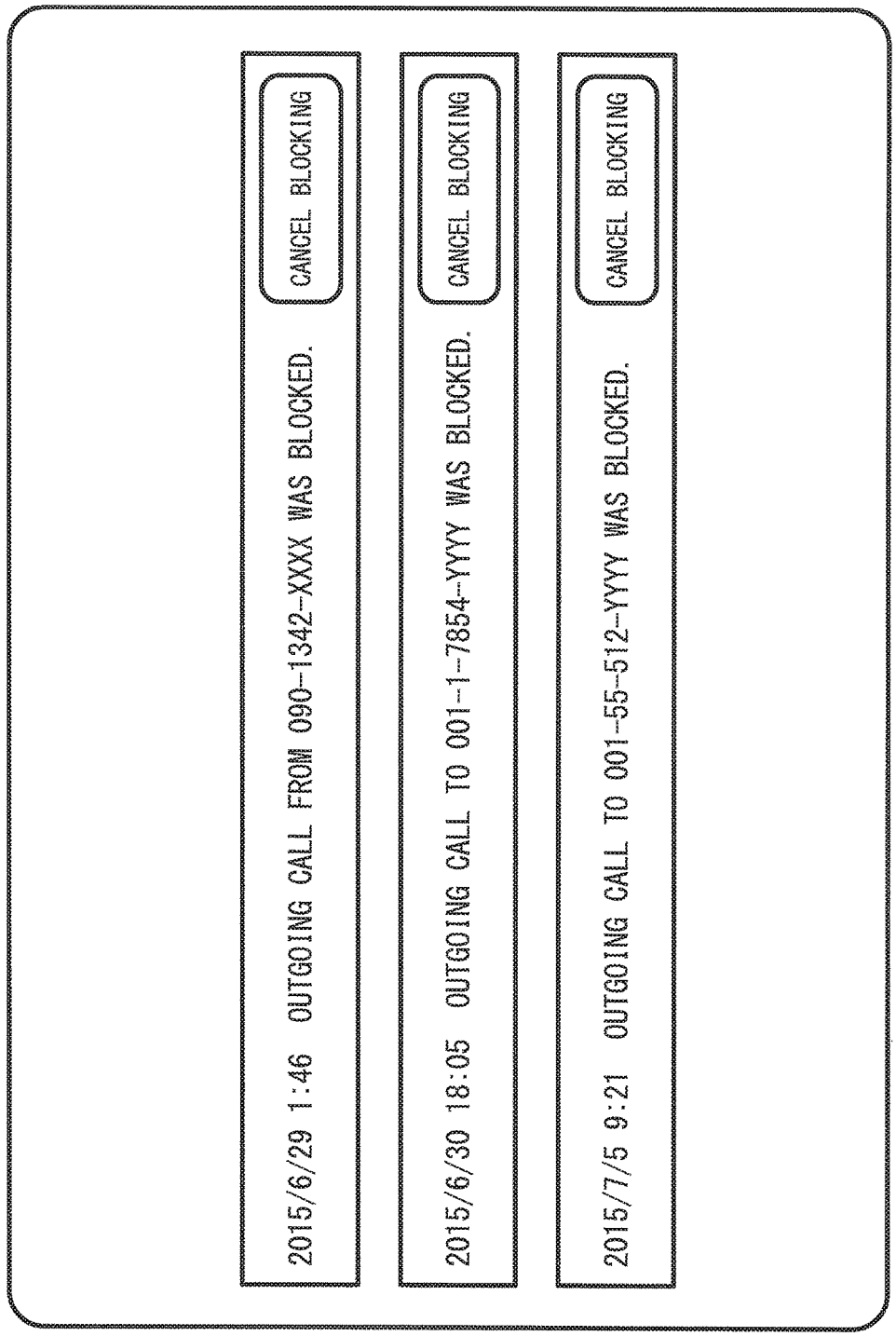
FIG. 11 is an example of a picture displayed in display means of a management terminal according to an exemplary embodiment of the present invention.

Next, the display means 370 of the management terminal 360 displays the above-described blocking information (step S2016). FIG. 11 shows a specific example of the blocking information.

As shown in FIG. 11, the above-described blocking information, in particular, dates/times of blocking, calling sources, and/or calling destinations are displayed in a text format in the display means 370. Further, buttons for instructing to cancel the blocking are also displayed on the right side in the columns in which their respective data are displayed. Note that when a user of the telephone switching system 150 wants to cancel the blocking of the outgoing call from the calling source and/or the outgoing call to the calling destination of certain data, the user clicks the button for that data. In response to this, the command generation means 380 of the management terminal 360 generates a command corresponding to the above-described cancelling of the blocking (step S2017).

Next, the transmitting means 310 of the management terminal 360 transmits the command generated in the step S2017 to the telephone switchboard 270 (step S2018).

Next, the receiving means 230 of the telephone switchboard 270 receives the command transmitted in the above-described step S2018 (step S2019).

Next, the setting means 250 of the telephone switchboard 270 changes the blocking condition set in the step S2011 and thereby cancels the blocking (step S2020).

In this way, a user of the telephone switching system 150 can set (or define) an operation condition that is applied when a predetermined event occurs in the telephone switchboard 270, e.g., when an illegal outgoing call occurs in the telephone switchboard 270 just by performing a clicking action only once or several times at the maximum.

Further, although an illegal outgoing call is blocked in the above-described example, an illegal incoming call may be blocked in other embodiments. In such cases, i.e., in other embodiments, a condition for detecting an illegal incoming call, e.g., a condition that numbers that begin with "0120" should be regulated is set in the above-described step S2001. Then, when it is detected that a call from "0120-345-XXX" is received in the above-described step S2004, a command for blocking a call from "0120-345-XXX" after this detection is generated in the above-described step S2008.

Further, in the explanation above, an embodiment in which a detecting condition for detecting a predetermined event, e.g., an illegal outgoing call is set by the setting means 340 of the management terminal 360 is described. However, a detecting condition based on which the telephone switchboard 270 detects an illegal outgoing call may be set by creating a command containing the detecting condition described therein by using the command generation means 380 and transmitting this command to the telephone switchboard 270 by using the transmitting means 310. Alternatively, in other embodiments, the detecting condition may be set from the telephone switchboard 270 side by using the setting means 250, instead of being set from the management terminal 360 side by using the setting means 340.

Further, some or all of the transmitting means 310, the receiving means 320, the setting means 340, the control means 350, the display means 370, and the command generation means 380 of the management terminal 360 may be integrally constructed as an "illegal outgoing call control application".

Further, in the explanation above, the telephone switching system 150 according to the present invention includes the telephone switchboard 270 and the management terminal 360. However, the telephone switching system 150 may also include the above-described router 400. In such a case, the telephone switchboard 270 and the router 400 may be integrally constructed.

Further, the above-described detection means 210 of the telephone switchboard 270 may detect illegal access to the telephone switchboard 270 or/and identity fraud. Alternatively, the above-described telephone switching system 150 may be combined with another means for detecting illegal access to the telephone switchboard 270 or/and identity fraud. In such cases, the above-described "predetermined event" may be the illegal access or/and identity fraud themselves, or may be an outgoing call to an illegal calling destination that is carried out after illegal access or/and identity fraud is carried out.

Further, communication may be carried out between the telephone switchboard 270 and the management terminal 360 according to a uniquely-defined (or proprietary) protocol. Further, for example, HTTP, FTP, Telnet, TCP, UDP, or the like may be used as the protocol.

According to the above-described second exemplary embodiment, a user can set/change an operation condition for the telephone switchboard that is applied when a predetermined event occurs, e.g., a blocking condition that is applied when an illegal outgoing call occurs in the above-described example, just by performing a clicking action only once or several times at the maximum. Further, a user can select whether outgoing calls are automatically regulated or manually regulated according to the situation such as whether the illegal outgoing call information is viewable (i.e., readable) or not. Further, even when outgoing calls are manually regulated, the user can regulate outgoing calls or cancel the regulation just by performing a clicking action only once or several times at the maximum. Therefore, compared to the related art, the user can be saved from troublesome tasks.

Other Exemplary Embodiment

In the above-described first and second exemplary embodiments, the management terminal 300 or 360 is notified of an occurrence of an illegal outgoing call that meets the predetermined condition when the illegal outgoing call occurs only once in the telephone switchboard 200 or 270. However, the management terminal 300 or 360 may be notified of an occurrence of an illegal outgoing call when the number of occurrences of illegal outgoing calls reaches a predetermined threshold number.

Similarly, in above-described first and second exemplary embodiments, the management terminal 300 or 360 is notified of an occurrence of blocking that meets the predetermined condition when the blocking occurs only once in the telephone switchboard 200 or 270. However, the management terminal 300 or 360 may be notified of an occurrence of blocking when the number of occurrences of blocking reaches a predetermined threshold number.

Further, a setting for limiting the period of time during which the telephone switchboard 200 or 270 monitors a predetermined event such as an illegal outgoing call, an illegal incoming call, and illegal access, and/or a setting for specifying the interval between monitoring time periods can be made.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Note that each part of the above-described telephone switching system, the telephone switchboard, and the management terminal can be implemented by either of hardware or software, or a combination thereof. Further, a telephone switching method performed by the above-described telephone switching system can also be implemented by either of hardware or software, or a combination thereof. Note that the implementation by software means that implementation by having a computer read a program, or implementation by having a hardware device operate according to a microcode corresponding to a program.

A program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The whole or part of the exemplary embodiments disclosed above can be described as, but not limited to, the following supplementary notes.

(Supplementary Note 1)

A telephone switching system comprising a telephone switchboard and a management terminal connected to the telephone switchboard, wherein the telephone switchboard comprises:

detection means for detecting an occurrence of a predetermined event;

e-mail creation means for creating a notification mail in which a content of the event detected by the detection means is described; and transmitting means for transmitting the notification mail to the management terminal, the management terminal comprises:

receiving means for receiving the notification mail;

e-mail creation means for creating a reply mail corresponding to the notification mail received by the receiving means; and transmitting means for transmitting the reply mail to the telephone switchboard, and the telephone switchboard further comprises:

receiving means for receiving the reply mail; and setting means for setting an operation condition for a predetermined operation performed by the telephone switchboard based on the reply mail received by the receiving means.

(Supplementary Note 2)

The telephone switching system described in Supplementary note 1, wherein the predetermined event is an illegal outgoing call using the telephone switchboard, and the set operation condition is a condition for regulating the illegal outgoing call.

(Supplementary Note 3)

The telephone switching system described in Supplementary note 2, wherein the regulation for the illegal outgoing call is a regulation for a call to a calling destination of the illegal outgoing call.

(Supplementary Note 4)

The telephone switching system described in Supplementary note 2 or 3, wherein the regulation for the illegal outgoing call is a regulation for a call from a calling source of the illegal outgoing call.

(Supplementary Note 5)

The telephone switching system described in Supplementary note 1, wherein the predetermined event is an illegal incoming call using the telephone switchboard, and the set operation condition is a condition for regulating the illegal incoming call.

(Supplementary Note 6)

The telephone switching system described in Supplementary note 1, wherein the predetermined event is illegal access using the telephone switchboard, and the set operation condition is a condition for regulating the illegal access.

(Supplementary Note 7)

The telephone switching system described in any one of Supplementary notes 1 to 6, wherein a setting file in which an operation condition for a predetermined operation performed by the telephone switchboard is described is attached to the reply mail.

(Supplementary Note 8)

The telephone switching system described in any one of Supplementary notes 1 to 6, wherein an operation condition for a predetermined operation performed by the telephone switchboard is described in the reply mail itself.

(Supplementary Note 9)

The telephone switching system described in any one of Supplementary notes 1 to 6, wherein the reply mail is a blank mail.

(Supplementary Note 10)

The telephone switching system described in any one of Supplementary notes 1 to 9, wherein the creation and the transmission of the reply mail in the management terminal are automatically carried out based on a preparatory setting without involving an operation by a user.

(Supplementary Note 11)

The telephone switching system described in any one of Supplementary notes 1 to 10, wherein the management terminal further comprises setting means for setting a condition for detecting the predetermined event.

(Supplementary Note 12)

A telephone switching system comprising a telephone switchboard and a management terminal connected to the telephone switchboard, wherein the telephone switchboard comprises:

detection means for detecting an occurrence of a predetermined event; and transmitting means for transmitting data indicating a content of the event detected by the detection means to the management terminal, the management terminal comprises:

receiving means for receiving the data;

display means for displaying the received data;

command input means for enabling a user to enter a command according to the data displayed by the display means; and transmitting means for transmitting the command to the telephone switchboard, and the telephone switchboard further comprises:

receiving means for receiving the command; and setting means for setting an operation condition for a predetermined operation performed by the telephone switchboard based on the command received by the receiving means.

(Supplementary Note 13)

The telephone switching system described in Supplementary note 12, wherein the predetermined event is an illegal outgoing call using the telephone switchboard, and the set operation condition is a condition for regulating the illegal outgoing call.

(Supplementary Note 14)

The telephone switching system described in Supplementary note 13, wherein the regulation for the illegal outgoing call is a regulation for a call to a calling destination of the illegal outgoing call.

(Supplementary Note 15)

The telephone switching system described in Supplementary note 13 or 14, wherein the regulation for the illegal outgoing call is a regulation for a call from a calling source of the illegal outgoing call.

(Supplementary Note 16)

The telephone switching system described in Supplementary note 12, wherein the predetermined event is an illegal incoming call using the telephone switchboard, and the set operation condition is a condition for regulating the illegal incoming call.

(Supplementary Note 17)

The telephone switching system described in Supplementary note 12, wherein the predetermined event is illegal access using the telephone switchboard, and the set operation condition is a condition for regulating the illegal access.

(Supplementary Note 18)

The telephone switching system described in any one of Supplementary notes 12 to 17, wherein the command contains an operation condition for a predetermined operation performed by the telephone switchboard.

(Supplementary Note 19)

The telephone switching system described in any one of Supplementary notes 12 to 18, wherein the creation and the transmission of the command in the management terminal are automatically carried out based on a preparatory setting without involving an operation by a user.

(Supplementary Note 20)

The telephone switching system described in any one of Supplementary notes 12 to 19, wherein the management terminal further comprises setting means for setting a condition for detecting the predetermined event.

(Supplementary Note 21)

A telephone switchboard used in a telephone switching system comprising the telephone switchboard and a management terminal connected to the telephone switchboard, the telephone switchboard comprising:

detection means for detecting an occurrence of a predetermined event;

e-mail creation means for creating a notification mail in which a content of the event detected by the detection means is described;

transmitting means for transmitting the notification mail to the management terminal, receiving means for receiving a reply mail corresponding to the notification mail from the management terminal, the management terminal being configured to create the reply mail; and setting means for setting an operation condition for a predetermined operation performed by the telephone switchboard based on the reply mail received by the receiving means.

(Supplementary Note 22)

The telephone switchboard described in Supplementary note 21, wherein the predetermined event is an illegal outgoing call using the telephone switchboard, and the set operation condition is a condition for regulating the illegal outgoing call.

(Supplementary Note 23)

The telephone switchboard described in Supplementary note 22, wherein the regulation for the illegal outgoing call is a regulation for a call to a calling destination of the illegal outgoing call.

(Supplementary Note 24)

The telephone switchboard described in Supplementary note 22 or 23, wherein the regulation for the illegal outgoing call is a regulation for a call from a calling source of the illegal outgoing call.

(Supplementary Note 25)

The telephone switchboard described in Supplementary note 21, wherein the predetermined event is an illegal incoming call using the telephone switchboard, and the set operation condition is a condition for regulating the illegal incoming call.

(Supplementary Note 26)

The telephone switchboard described in Supplementary note 21, wherein the predetermined event is illegal access using the telephone switchboard, and the set operation condition is a condition for regulating the illegal access.

(Supplementary Note 27)

The telephone switchboard described in any one of Supplementary notes 21 to 26, wherein a setting file in which an operation condition for a predetermined operation performed by the telephone switchboard is described is attached to the reply mail.

(Supplementary Note 28)

The telephone switchboard described in any one of Supplementary notes 21 to 26, wherein an operation condition for a predetermined operation performed by the telephone switchboard is described in the reply mail itself.

(Supplementary Note 29)

The telephone switchboard described in any one of Supplementary notes 21 to 26, wherein the reply mail is a blank mail.

(Supplementary Note 30)

The telephone switchboard described in any one of Supplementary notes 21 to 29, wherein the creation and the transmission of the reply mail in the management terminal are automatically carried out based on a preparatory setting without involving an operation by a user.

(Supplementary Note 31)

The telephone switchboard described in any one of Supplementary notes 21 to 30, wherein the management terminal further comprises setting means for setting a condition for detecting the predetermined event.

(Supplementary Note 32)

A management terminal used in a telephone switching system comprising a telephone switchboard and the management terminal, the management terminal comprising:

receiving means for receiving a notification mail from the telephone switchboard, the telephone switchboard being configured to detect an occurrence of a predetermined event, create the notification mail in which a content of the detected event is described, and transmit the notification mail to the management terminal;

creation means for creating a reply mail corresponding to the notification mail received by the receiving means, the reply mail being a mail for setting an operation condition for a predetermined operation performed by the telephone switchboard based on the reply mail; and transmitting means for transmitting the reply mail to the telephone switchboard.

(Supplementary Note 33)

The management terminal described in Supplementary note 32, wherein the predetermined event is an illegal outgoing call using the telephone switchboard, and the set operation condition is a condition for regulating the illegal outgoing call.

(Supplementary Note 34)

The management terminal described in Supplementary note 33, wherein the regulation for the illegal outgoing call is a regulation for a call to a calling destination of the illegal outgoing call.

(Supplementary Note 35)

The management terminal described in Supplementary note 33 or 34, wherein the regulation for the illegal outgoing call is a regulation for a call from a calling source of the illegal outgoing call.

(Supplementary Note 36)

The management terminal described in Supplementary note 32, wherein the predetermined event is an illegal incoming call using the telephone switchboard, and the set operation condition is a condition for regulating the illegal incoming call.

(Supplementary Note 37)

The management terminal described in Supplementary note 32, wherein the predetermined event is illegal access using the telephone switchboard, and the set operation condition is a condition for regulating the illegal access.

(Supplementary Note 38)

The management terminal described in any one of Supplementary notes 32 to 37, wherein a setting file in which an operation condition for a predetermined operation performed by the telephone switchboard is described is attached to the reply mail.

(Supplementary Note 39)

The management terminal described in any one of Supplementary notes 32 to 37, wherein an operation condition for a predetermined operation performed by the telephone switchboard is described in the reply mail itself.

(Supplementary Note 40)

The management terminal described in any one of Supplementary notes 32 to 37, wherein the reply mail is a blank mail.

(Supplementary Note 41)

The management terminal described in any one of Supplementary notes 32 to 40, wherein the creation and the transmission of the reply mail in the management terminal are automatically carried out based on a preparatory setting without involving an operation by a user.

(Supplementary Note 42)

The management terminal described in any one of Supplementary notes 32 to 41, wherein the management terminal further comprises setting means for setting a condition for detecting the predetermined event.

(Supplementary Note 43)

A telephone switching method in a telephone switching system comprising a telephone switchboard and a management terminal connected to the telephone switchboard, the telephone switching method comprising:

detecting, by the telephone switchboard, an occurrence of a predetermined event;

creating, by the telephone switchboard, an e-mail in which a content of the detected event is described;

transmitting, by the telephone switchboard, the e-mail to the management terminal;

receiving, by the management terminal, the e-mail;

creating, by the management terminal, a reply mail to the received e-mail;

transmitting, by the management terminal, the reply mail to the telephone switchboard;

receiving, by the telephone switchboard, the reply mail; and setting, by the telephone switchboard, an operation condition for a predetermined operation performed by the telephone switchboard based on the received reply mail.

(Supplementary Note 44)

The telephone switching method described in Supplementary note 43, wherein the predetermined event is an illegal outgoing call using the telephone switchboard, and the set operation condition is a condition for regulating the illegal outgoing call.

(Supplementary Note 45)

The telephone switching method described in Supplementary note 44, wherein the regulation for the illegal outgoing call is a regulation for a call to a calling destination of the illegal outgoing call.

(Supplementary Note 46)

The telephone switching method described in Supplementary note 44 or 45, wherein the regulation for the illegal outgoing call is a regulation for a call from a calling source of the illegal outgoing call.

(Supplementary Note 47)

The telephone switching method described in Supplementary note 43, wherein the predetermined event is an illegal incoming call using the telephone switchboard, and the set operation condition is a condition for regulating the illegal incoming call.

(Supplementary Note 48)

The telephone switching method described in Supplementary note 43, wherein the predetermined event is illegal access using the telephone switchboard, and the set operation condition is a condition for regulating the illegal access.

(Supplementary Note 49)

The telephone switching method described in any one of Supplementary notes 43 to 48, wherein a setting file in which an operation condition for a predetermined operation performed by the telephone switchboard is described is attached to the reply mail.

(Supplementary Note 50)

The telephone switching method described in any one of Supplementary notes 43 to 48, wherein an operation condition for a predetermined operation performed by the telephone switchboard is described in the reply mail itself.

(Supplementary Note 51)

The telephone switching method described in any one of Supplementary notes 43 to 48, wherein the reply mail is a blank mail.

(Supplementary Note 52)

The telephone switching method described in any one of Supplementary notes 43 to 51, wherein the creation and the transmission of the reply mail in the management terminal are automatically carried out based on a preparatory setting without involving an operation by a user.

(Supplementary Note 53)

The telephone switching method described in any one of Supplementary notes 43 to 52, further comprising, by the management terminal, setting a detecting condition for the predetermined event.

(Supplementary Note 54)

A telephone switching program for causing a computer to function as a telephone switchboard used in a telephone switching system comprising the telephone switchboard and a management terminal connected to the telephone switchboard, the telephone switching program being adapted to cause the computer to function as:

detection means for detecting an occurrence of a predetermined event;

e-mail creation means for creating a notification mail in which a content of the event detected by the detection means is described;

transmitting means for transmitting the notification mail to the management terminal, receiving means for receiving a reply mail to the notification mail from the management terminal, the management terminal being configured to create the reply mail; and setting means for setting an operation condition for a predetermined operation performed by the telephone switchboard based on the reply mail received by the receiving means.

(Supplementary Note 55)

The telephone switching program described in Supplementary note 54, wherein the predetermined event is an illegal outgoing call using the telephone switchboard, and the set operation condition is a condition for regulating the illegal outgoing call.

(Supplementary Note 56)

The telephone switching program described in Supplementary note 55, wherein the regulation for the illegal outgoing call is a regulation for a call to a calling destination of the illegal outgoing call.

(Supplementary Note 57)

The telephone switching program described in Supplementary note 55 or 56, wherein the regulation for the illegal outgoing call is a regulation for a call from a calling source of the illegal outgoing call.

(Supplementary Note 58)

The telephone switching program described in Supplementary note 54, wherein the predetermined event is an illegal incoming call using the telephone switchboard, and the set operation condition is a condition for regulating the illegal incoming call.

(Supplementary Note 59)

The telephone switching program described in Supplementary note 54, wherein the predetermined event is illegal access using the telephone switchboard, and the set operation condition is a condition for regulating the illegal access.

(Supplementary Note 60)

The telephone switching program described in any one of Supplementary notes 54 to 59, wherein a setting file in which an operation condition for a predetermined operation performed by the telephone switchboard is described is attached to the reply mail.

(Supplementary Note 61)

The telephone switching program described in any one of Supplementary notes 54 to 59, wherein an operation condition for a predetermined operation performed by the telephone switchboard is described in the reply mail itself.

(Supplementary Note 62)

The telephone switching program described in any one of Supplementary notes 54 to 59, wherein the reply mail is a blank mail.

(Supplementary Note 63)

The telephone switching program described in any one of Supplementary notes 54 to 62, wherein the creation and the transmission of the reply mail in the management terminal are automatically carried out based on a preparatory setting without involving an operation by a user.

(Supplementary Note 64)

The telephone switching program described in any one of Supplementary notes 54 to 63, wherein the management terminal further comprises setting means for setting a condition for detecting the predetermined event.

(Supplementary Note 65)

A telephone switching program for causing a computer to function as a management terminal used in a telephone switching system comprising a telephone switchboard and the management terminal, the telephone switching program being adapted to cause the computer to function as:

receiving means for receiving an e-mail from the telephone switchboard, the telephone switchboard being configured to detect an occurrence of a predetermined event, create the e-mail in which a content of the detected event is described, and transmit the e-mail to the management terminal;

creation means for creating a reply mail to the e-mail received by the receiving means, the reply mail being a mail for setting an operation condition for a predetermined operation performed by the telephone switchboard based on the reply mail; and transmitting means for transmitting the reply mail to the telephone switchboard.

(Supplementary Note 66)

The telephone switching program described in Supplementary note 65, wherein the predetermined event is an illegal outgoing call using the telephone switchboard, and the set operation condition is a condition for regulating the illegal outgoing call.

(Supplementary Note 67)

The telephone switching program described in Supplementary note 66, wherein the regulation for the illegal outgoing call is a regulation for a call to a calling destination of the illegal outgoing call.

(Supplementary Note 68)

The telephone switching program described in Supplementary note 66 or 67, wherein the regulation for the illegal outgoing call is a regulation for a call from a calling source of the illegal outgoing call.

(Supplementary Note 69)

The telephone switching program described in Supplementary note 65, wherein the predetermined event is an illegal incoming call using the telephone switchboard, and the set operation condition is a condition for regulating the illegal incoming call.

(Supplementary Note 70)

The telephone switching program described in Supplementary note 65, wherein the predetermined event is illegal access using the telephone switchboard, and the set operation condition is a condition for regulating the illegal access.

(Supplementary Note 71)

The telephone switching program described in any one of Supplementary notes 65 to 70, wherein a setting file in which an operation condition for a predetermined operation performed by the telephone switchboard is described is attached to the reply mail.

(Supplementary Note 72)

The telephone switching program described in any one of Supplementary notes 65 to 70, wherein an operation condition for a predetermined operation performed by the telephone switchboard is described in the reply mail itself.

(Supplementary Note 73)

The telephone switching program described in any one of Supplementary notes 65 to 70, wherein the reply mail is a blank mail.

(Supplementary Note 74)

The telephone switching program described in any one of Supplementary notes 65 to 73, wherein the creation and the transmission of the reply mail in the management terminal are automatically carried out based on a preparatory setting without involving an operation by a user.

(Supplementary Note 75)

The telephone switching program described in any one of Supplementary notes 65 to 74, wherein the telephone switching program further causes the computer to function as setting means for setting a condition for detecting the predetermined event.

The present invention can be used in the field of telephone switching systems including telephone switchboards. Further, the present invention can also be used in the field in which illegal access to a computer is regulated.

What is claimed is:

1. A telephone switching system comprising a telephone switchboard and a management terminal connected to the telephone switchboard, wherein the telephone switchboard comprises:
   a detection unit that detects an occurrence of a predetermined event;
   an e-mail creation unit that creates a notification mail in which a content of the event detected by the detection unit is described; and
   a transmitting unit that transmits the notification mail to the management terminal, the management terminal comprises:
   a receiving unit that receives the notification mail;
   an e-mail creation unit that creates a reply mail corresponding to the notification mail received by the receiving unit; and
   a transmitting unit that transmits the reply mail to the telephone switchboard, and the telephone switchboard further comprises:
   a receiving unit that receives the reply mail; and
   a setting unit that sets an operation condition for a predetermined operation performed by the telephone switchboard based on the reply mail received by the receiving unit, and wherein the reply mail is a blank mail, and wherein the creation and the transmission of the reply mail in the management terminal are automatically carried out based on a preparatory setting without involving an operation by a user.

2. The telephone switching system according to claim 1, wherein the predetermined event is an illegal outgoing call using the telephone switchboard, and the set operation condition is a condition for regulating the illegal outgoing call.

3. The telephone switching system according to claim 2, wherein the regulation for the illegal outgoing call is a regulation for a call to a calling destination of the illegal outgoing call.

4. The telephone switching system according to claim 2, wherein the regulation for the illegal outgoing call is a regulation for a call from a calling source of the illegal outgoing call.

5. A telephone switchboard used in a telephone switching system comprising the telephone switchboard and a management terminal connected to the telephone switchboard, the telephone switchboard comprising:

a detection unit that detects an occurrence of a predetermined event;

an e-mail creation unit that creates a notification mail in which a content of the event detected by the detection unit is described;

a transmitting unit that transmits the notification mail to the management terminal, a receiving unit that receives a reply mail corresponding to the notification mail from the management terminal, the management terminal being configured to create the reply mail; and a setting unit that sets an operation condition for a predetermined operation performed by the telephone switchboard based on the reply mail received by the receiving unit, and wherein the reply mail is a blank mail.

6. A management terminal used in a telephone switching system comprising a telephone switchboard and the management terminal, the management terminal comprising:

a receiving unit that receives a notification mail from the telephone switchboard, the telephone switchboard being configured to detect an occurrence of a predetermined event, create the notification mail in which a content of the detected event is described, and transmit the notification mail to the management terminal;

a creation unit that creates a reply mail corresponding to the notification mail received by the receiving unit, the reply mail being a mail for setting an operation condition for a predetermined operation performed by the telephone switchboard based on the reply mail; and a transmitting unit that transmits the reply mail to the telephone switchboard, and wherein the reply mail is a blank mail, and wherein the creation and the transmission of the reply mail in the management terminal are automatically carried out based on a preparatory setting without involving an operation by a user.

7. A telephone switching method in a telephone switching system comprising a telephone switchboard and a management terminal connected to the telephone switchboard, the telephone switching method comprising:

detecting, by the telephone switchboard, an occurrence of a predetermined event;

creating, by the telephone switchboard, an e-mail in which a content of the detected event is described;

transmitting, by the telephone switchboard, the e-mail to the management terminal;

receiving, by the management terminal, the e-mail;

creating, by the management terminal, a reply mail to the received e-mail;

transmitting, by the management terminal, the reply mail to the telephone switchboard;

receiving, by the telephone switchboard, the reply mail; and setting, by the telephone switchboard, an operation condition for a predetermined operation performed by the telephone switchboard based on the received reply mail, and wherein the reply mail is a blank mail, and wherein the creation and the transmission of the reply mail in the management terminal are automatically carried out based on a preparatory setting without involving an operation by a user.

8. A non-transitory computer-readable recording medium storing a telephone switching program for causing a computer to function as a telephone switchboard used in a telephone switching system comprising the telephone switchboard and a management terminal connected to the telephone switchboard, the telephone switching program being adapted to cause, when executed, the computer to function as:

a detection unit that detects an occurrence of a predetermined event;

an e-mail creation unit that creates a notification mail in which a content of the event detected by the detection unit is described;

a transmitting unit that transmits the notification mail to the management terminal, receiving unit that receives a reply mail to the notification mail from the management terminal, the management terminal being configured to create the reply mail; and a setting unit that sets an operation condition for a predetermined operation performed by the telephone switchboard based on the reply mail received by the receiving unit, and wherein the reply mail is a blank mail.

9. A non-transitory computer-readable recording medium storing a telephone switching program for causing a computer to function as a management terminal used in a telephone switching system comprising a telephone switchboard and the management terminal, the telephone switching program being adapted to cause, when executed, the computer to function as:

a receiving unit that receives an e-mail from the telephone switchboard, the telephone switchboard being configured to detect an occurrence of a predetermined event, create the e-mail in which a content of the detected event is described, and transmit the e-mail to the management terminal;

a creation unit that creates a reply mail to the e-mail received by the receiving unit, the reply mail being a mail for setting an operation condition for a predetermined operation performed by the telephone switchboard based on the reply mail; and a transmitting unit that transmits the reply mail to the telephone switchboard, and wherein the reply mail is a blank mail, and wherein the creation and the transmission of the reply mail in the management terminal are automatically carried out based on a preparatory setting without involving an operation by a user.

* * * * *

UNITED STATES PATENT AND TRADEMARK OFFICE
CERTIFICATE OF CORRECTION

| | | |
|---|---|---|
| PATENT NO. | : 9,692,910 B1 | |
| APPLICATION NO. | : 15/375728 | |
| DATED | : June 27, 2017 | |
| INVENTOR(S) | : Kentaroh Okamoto | |

It is certified that error appears in the above-identified patent and that said Letters Patent is hereby corrected as shown below:

On the Title Page

Column 1, Line 1:
After "2016", insert --¶(65) Prior Publication Data
US 2017/0180563 A1 Jun. 22, 2017--

Signed and Sealed this
Twentieth Day of February, 2018

Andrei Iancu
*Director of the United States Patent and Trademark Office*